(12) United States Patent
Yu

(10) Patent No.: US 8,069,672 B2
(45) Date of Patent: Dec. 6, 2011

(54) METHOD AND SYSTEMS FOR OPERATING A COMBINED CYCLE POWER PLANT

(75) Inventor: Ping Yu, Shanghai (CN)

(73) Assignee: General Electric Company, Schenectady, NY (US)

(*) Notice: Subject to any disclaimer, the term of this patent is extended or adjusted under 35 U.S.C. 154(b) by 439 days.

(21) Appl. No.: 12/341,211

(22) Filed: Dec. 22, 2008

(65) Prior Publication Data
US 2010/0154428 A1 Jun. 24, 2010

(51) Int. Cl.
*F02C 9/00* (2006.01)
(52) U.S. Cl. .................................. 60/795; 60/39.12
(58) Field of Classification Search ............. 60/39.12, 60/780, 781, 783, 785, 794, 795, 801
See application file for complete search history.

(56) References Cited

U.S. PATENT DOCUMENTS

| | | | | | |
|---|---|---|---|---|---|
| 3,744,925 | A | * | 7/1973 | Kraemer | 415/17 |
| 4,442,665 | A | * | 4/1984 | Fick et al. | 60/39.12 |
| 5,517,815 | A | * | 5/1996 | Fujioka et al. | 60/39.12 |
| 5,609,041 | A | * | 3/1997 | Rathbone et al. | 62/646 |
| 5,802,875 | A | * | 9/1998 | Drnevich | 62/656 |
| 6,568,207 | B1 | * | 5/2003 | Brugerolle et al. | 62/643 |
| 7,451,591 | B2 | * | 11/2008 | Wakefield et al. | 60/39.464 |
| 7,805,923 | B2 | * | 10/2010 | Yoshida | 60/39.464 |
| 2007/0151256 | A1 | * | 7/2007 | Kamohara et al. | 60/781 |
| 2010/0019496 | A1 | * | 1/2010 | Yu | 290/52 |
| 2010/0154432 | A1 | * | 6/2010 | Yu | 60/785 |

\* cited by examiner

*Primary Examiner* — Louis Casaregola
*Assistant Examiner* — Phutthiwat Wongwian
(74) *Attorney, Agent, or Firm* — Dale J. Davis; Ernest G. Cusick; Frank A. Landgraff

(57) ABSTRACT

An embodiment of the present invention may provide a variable speed booster, which receives air from a compressor of a gas turbine through an intercooler, to supply air at a relatively constant pressure to an air processing unit. An embodiment of the present invention may provide a speed adjustable booster turbine to energize a variable speed booster; which provides air at a relatively constant pressure to an air processing unit.

26 Claims, 4 Drawing Sheets

Prior Art

METHOD AND SYSTEMS FOR OPERATING A COMBINED CYCLE POWER PLANT

This application is related to commonly-assigned U.S. patent application Ser. No. 12/180,935, filed Jul. 28, 2008.

BACKGROUND OF THE INVENTION

This invention relates generally to power generation systems and, more particularly, to combined cycle power plants that include large variable speed process equipment.

Some known integrated gasification combined cycle (IGCC) power plants use an air separation unit to generate a flow of oxidant for the gasification process. Generally, the air separation unit requires a source of relatively constant flow and pressure compressed air. A motor driven compressor is typically used for providing the compressed air at the necessary flow and pressure. However, the motor driven compressor is an expensive piece of equipment that uses significant electrical power. Furthermore, the motor driven compressor may be considered a parasitic load on the IGCC power plant, leading to a reduction in the overall efficiency.

Another source of air for the air processing unit is the compressor of the gas turbine associated with the IGCC power plant. However, the air provided by the compressor is at variable pressure and flows based on a load on the gas turbine.

For the foregoing reasons, there is a need for a system and method providing a source of relatively constant flow and pressure compressed air to an air processing unit. The system and method should not be a parasitic load on the IGCC power plant. The system and method should provide a source of relatively constant pressure and adjustable flow of compressed air across a load range of the gas turbine.

BRIEF DESCRIPTION OF THE INVENTION

In accordance with an embodiment of the present invention, a combined cycle powerplant system comprising: a gas turbine comprising: a compressor, a combustion chamber, and a turbine section drivingly coupled to the compressor; a source of bleed air from the compressor coupled in flow communication with an inlet of a variable guide vane booster; and an air separation unit coupled in flow communication with an outlet of the variable guide vane booster, the variable guide vane booster integrated with a speed adjustable booster turbine, wherein the speed adjustable booster turbine powers the variable guide vane booster to extract air from the compressor.

In accordance with a first alternate embodiment of the present invention, a method of operating a combined cycle powerplant system, the method comprising: providing a gas turbine comprising a compressor, wherein the gas turbine generates an exhaust; coupling a source of bleed air deriving from the compressor with an inlet of a variable guide vane booster; and coupling an outlet of the variable guide vane booster with an air separation unit, and utilizing a speed adjustable booster turbine to provide the energy required to operate the variable guide vane booster.

In accordance with a second alternate embodiment of the present invention, an integrated gasification combined cycle (IGCC) power plant comprising: a gas turbine comprising: a compressor, a combustion chamber, and a turbine section drivingly coupled to the compressor; and a variable guide vane booster coupled in flow communication between the compressor and an air separation unit, the variable guide vane booster configured to receive a flow of compressed air at a variable flow and pressure and to generate a flow of compressed air at a flow that matches a demand using one or more variable vanes and a substantially constant pressure to the air separation unit, the variable guide vane booster drivingly coupled to a speed adjustable booster turbine that allows for an adjustment of speed.

BRIEF DESCRIPTION OF THE DRAWINGS

These and other features, aspects, and advantages of the present invention will become better understood when the following detailed description is read with reference to the accompanying drawings in which like characters represent like elements throughout the drawings.

DETAILED DESCRIPTION OF THE INVENTION

The following detailed description of preferred embodiments refers to the accompanying drawings, which illustrate specific embodiments of the invention. Other embodiments having different structures and operations do not depart from the scope of the present invention.

Certain terminology is used herein for the convenience of the reader only and is not to be taken as a limitation on the scope of the invention. For example, words such as "upper", "lower", "left", "right", "front", "rear", "top", "bottom", "horizontal", "vertical", "upstream", "downstream", "fore", "aft", and the like; merely describe the configuration shown in the Figures. Indeed, the element or elements of an embodiment of the present invention may be oriented in any direction and the terminology, therefore, should be understood as encompassing such variations unless specified otherwise.

As used herein, an element or step recited in the singular and proceeded with the word "a" or "an" should be understood as not excluding plural elements or steps, unless such exclusion is explicitly recited. Furthermore, references to "one embodiment" of the present invention are not intended to be interpreted as excluding the existence of additional embodiments that also incorporate the recited features.

An embodiment of the present invention may provide a variable speed booster, which receives air from a compressor of a gas turbine through an intercooler, to supply air at a relatively constant pressure to an air processing unit. An embodiment of the present invention may provide a speed adjustable booster turbine to energize a variable speed booster; which provides air at a relatively constant pressure to an air processing unit.

Figure 1:
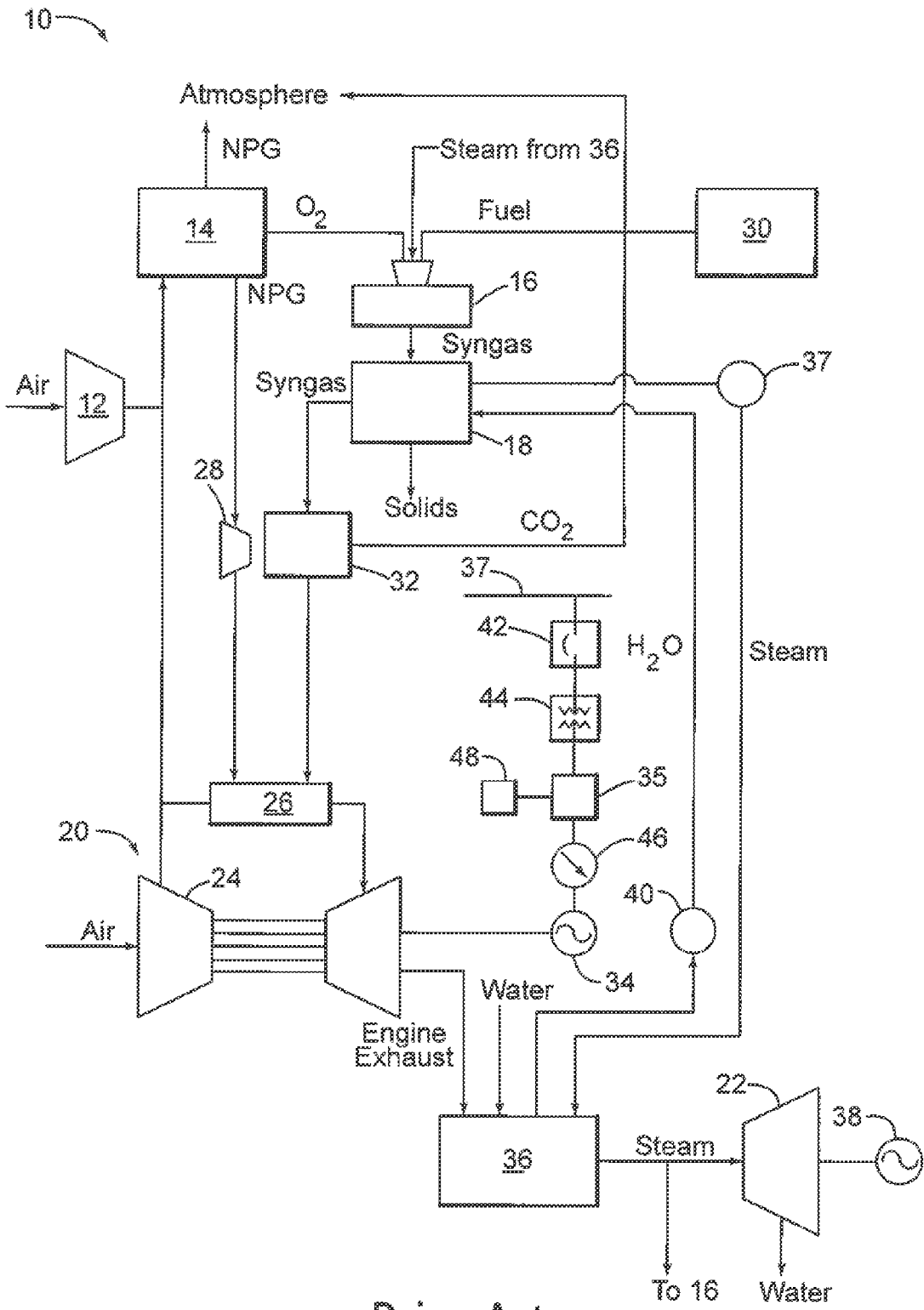
FIG. 1 is a schematic illustrating a known integrated gasification combined-cycle (IGCC) power generation system.

Referring now to the Figures, where the various numbers represent like elements throughout the several views, FIG. 1 is a schematic diagram of a known integrated gasification combined-cycle (IGCC) power generation system 10. IGCC power plant 10 generally includes a main air a compressor 12, an air separation unit (ASU) 14 coupled in flow communication to the compressor 12, a gasifier 16 coupled in flow communication to the ASU 14, a syngas cooler 18 coupled in flow communication to a gasifier 16, a gas turbine 20 coupled in flow communication to the syngas cooler 18, and a steam turbine 22 coupled in flow communication to the syngas cooler 18. In some IGCC power generation systems 10, the gasifier 16 and the syngas cooler 18 may be combined into a single integral vessel.

In operation, the compressor 12 compresses ambient air that may then be channeled to the ASU 14. In some IGCC power generation systems 10, compressed air from a gas turbine compressor 24 may also be channeled to the ASU 14. Alternatively, compressed air from the gas turbine compressor 24 is supplied to the ASU 14, rather than compressed air from the compressor 12 being supplied to the ASU 14. Here, the ASU 14 may use the compressed air to generate oxygen for use by the gasifier 16. More specifically, the ASU 14 separates the compressed air into separate flows of oxygen ($O_2$) and a gas by-product, sometimes referred to as a "process gas." The $O_2$ flow is channeled to the gasifier 16 for use in generating partially combusted gases, referred to herein as "syngas" for use by the gas turbine 20 as fuel, as further described below.

The process gas generated by the ASU 14 includes nitrogen and will be referred to herein as "nitrogen process gas" (NPG). The NPG may also include other gases such as, but not limited to, oxygen and/or argon. For example, the NPG may include between about 95% and about 100% nitrogen. In some IGCC power generation systems 10, at least some of the NPG flow is vented to the atmosphere from the ASU 14. Some of the NPG flow is injected into a combustion zone (not shown) within a gas turbine combustor 26 to facilitate controlling emissions of engine 20. This may facilitate reducing the combustion temperature and reducing nitrous oxide emissions from gas turbine 20. In some IGCC power generation systems 10, a compressor 28 may be used for compressing the NPG flow before injection into the combustion zone of the gas turbine combustor 26.

In some IGCC power generation systems 10, the gasifier 16 converts a mixture of fuel supplied from a fuel supply 30, $O_2$ supplied by the ASU 14, steam, and/or limestone into an output of syngas for use as fuel by the gas turbine 20 as fuel. Although the gasifier 16 may use any fuel, an embodiment of the gasifier 16, may use coal, petroleum coke, residual oil, oil emulsions, tar sands, and/or other similar fuels. Furthermore, in some IGCC power generation systems 10, the syngas generated by the gasifier 16 includes carbon dioxide. The gasifier 16 may comprise the form of a fixed-bed gasifier, a fluidized-bed gasifier, and/or a fully entrained gasifier.

In some IGCC power generation systems 10, syngas generated by the gasifier 16 is channeled to the syngas cooler 18 to facilitate cooling syngas, as described in more detail below. The cooled syngas is channeled from the syngas cooler 18 to a clean-up device 32 for cleaning the syngas before the syngas is channeled to the gas turbine combustor 26 for combustion purposes. Carbon dioxide ($CO_2$) may be separated from the syngas during clean-up and may be vented to the atmosphere. The gas turbine 20 drives a generator 34 that supplies electrical power to a power grid (not illustrated). Exhaust gases from the gas turbine 20 are channeled to a heat recovery steam generator (HRSG) 36 that generates steam for driving a steam turbine 22. Power generated by the steam turbine 22 may drive an electrical generator 38 that provides electrical power to the power grid. In some IGCC power generation systems 10, steam from the HRSG 36 is supplied to the gasifier 16 for generating syngas.

When starting the gas turbine 20, a starter 35 such as a load-commutated inverter (LCI) or static-frequency converter (SFC) may receive an AC electrical power from a power system bus 37, via a circuit breaker 42 and a power transformer 44. Starter 35 rectifies the AC power to DC power, then inverts the DC power into AC power having a variable AC frequency to supply to a generator 34 via disconnect switch 46. The generator 34 is operated as a synchronous motor to provide a torque control necessary for the gas turbine 20 to start. When the gas turbine 20 attains a self-sustaining, a speed disconnect switch 46 is opened to isolate starter 35 from the generator 34. Circuit breaker 42 is also opened to cut off power supply from power system bus 37. A starter controller 48 receives various sensing and command signals, and serves to regulate the operation of the generator 34, functioning as a motor during startup of the gas turbine 20. A starter 35 provides for adjustable speed operation and soft starting of the generator 34. Generally, soft starting reduces the mechanical stress on the generator 34 and the gas turbine 20 and facilitates eliminating electrical starting surges on the AC power system 37. An output transformer permits the starter 35 to operate with any voltage machine.

Furthermore, in some IGCC power generation systems 10 a pump 40 may supply boiled water from the HRSG 36 to the syngas cooler 18 to facilitate cooling the syngas channeled from the gasifier 16. The boiled water may be channeled through the syngas cooler 18 wherein the water is converted to steam. The steam from the syngas cooler 18 and then returned to the HRSG 36 for use within the gasifier 16, the syngas cooler 18, and/or the steam turbine 22.

Figure 2:
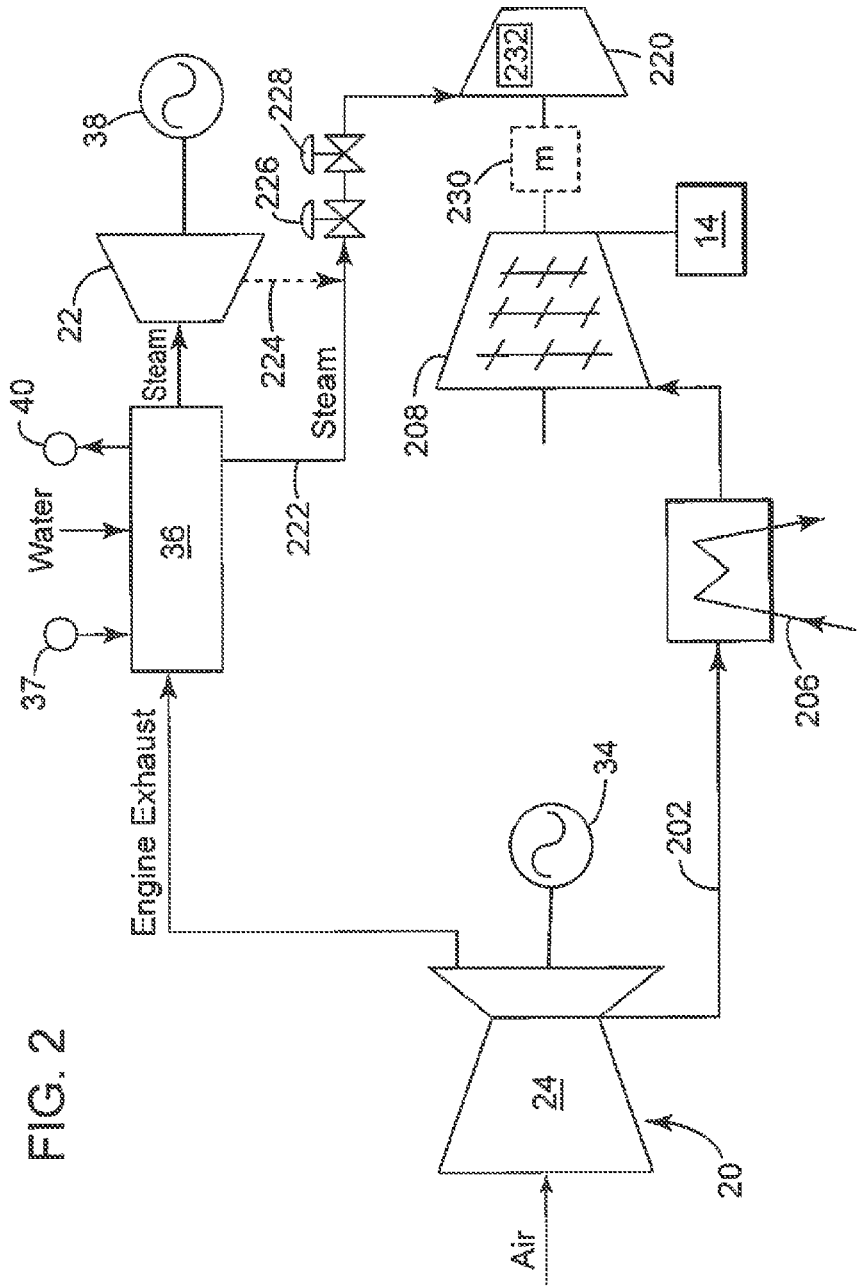
FIG. 2 is a schematic illustrating a portion of the system shown in FIG. 1, in accordance with an embodiment of the present invention.

FIG. 2 is a schematic illustrating a system a portion of the system shown in FIG. 1 in accordance with an embodiment of the present invention. In an embodiment of the present invention, compressed air from the gas turbine compressor 24 may be supplied to the ASU 14 through an intercooler 204 and a variable guide vane booster 208. Here, high temperature compressed air may be channeled from the gas turbine compressor 24 through a first flow path 202 of an intercooler 204. A flow of cooling fluid may flow through a second flow path 206 through intercooler 204. The ASU 14 may use the compressed air to generate oxygen for use by the gasifier 16. More specifically, the ASU 14 may separate the compressed air into separate flows of oxygen ($O_2$) and a gas by-product, sometimes referred to as a "process gas." To facilitate increasing the overall efficiency of system 10, the compressed air supplied to ASU 14 may be bleed from the gas turbine compressor 24 and then maintained at a relatively constant pressure using the variable guide vane booster 208. The variable guide vane booster 208 may comprise at least one of: an axial booster, a centrifugal booster, and combinations thereof.

In use, an embodiment of the present invention may supply compressed air to combustor 26 and the ASU 14 from the gas turbine compressor 24. The pressure of the compressor bleed airflow discharged from the gas turbine compressor 24 is variable and is related to the load on the generator 34. Instead of channeling the variable pressure compressor bleed airflow directly to the ASU 14, the variable guide vane booster 208 may regulate an inlet pressure to the ASU 14 by modulating the speed of the variable guide vane booster 208 using the speed adjustable booster turbine 220. The variable guide vane booster 208 may also adjust the airflow to the ASU 14 by using a set of variable guide vanes, such that the airflow supplied to the ASU 14 is at a substantially constant pressure over a wide range of operating loads of the gas turbine 20.

To regulate the pressure of the airflow directed to the ASU 14, the variable guide vane booster 208 may rotate at a variable speed to maintain a substantially constant outlet pressure. To modulate airflow of the compressed air flowing from the gas turbine compressor 24 to the ASU 14, the variable guide vane booster 208 may position the guide vanes to accommodate fluctuations in the flow due to the change in rotating speed and per airflow requirements of the ASU 14. The operation of the variable guide vane booster 208 permits a wide range of compressor bleed air flow and/or pressure due to changes in the load on the gas turbine 20 while maintaining a substantially constant outlet air pressure with a required amount of airflow at the inlet of the ASU 14.

In an embodiment of the present invention, a speed adjustable booster turbine 220 may power the variable guide vane booster 208. The speed adjustable booster turbine 220 may comprise a steam turbine 20, a steam pump, or combinations thereof. The speed adjustable booster turbine 220 may be integrated with the variable guide vane booster 208 in a manner allowing for the speed adjustable booster turbine 220 to power the variable guide vane booster 208. For example, but not limiting of, the speed adjustable booster turbine 220 may be mechanically coupled to the variable guide vane booster 208. Here a speed of the speed adjustable booster turbine 220 may determine a speed of the variable guide vane booster 208.

Alternatively, the speed adjustable booster turbine 220 may be coupled with a booster motor 230. Here, the operation of the speed adjustable booster turbine 220 may energize the booster motor 230, which may be electrically coupled to the variable guide vane booster 208. Here, the booster motor 230 may provide power to the variable guide vane booster 208.

In an embodiment of the present invention, the speed adjustable booster turbine 220 may receive steam from the HRSG 36 via a first steam path 222. Here, the steam may travel from an exit location on the HRSG 36, through a stop valve 226 and a control valve 228 and through an entry location on the speed adjustable booster turbine 220. In a first alternate embodiment of the present invention, the speed adjustable booster turbine 220 may receive steam from the steam turbine 22 via a second steam path 224. Here, the steam may travel from an exit location on the steam turbine 22, through the stop valve 226 and the control valve 228 and through an entry location on the speed adjustable booster turbine 220. In a third embodiment of the present invention, the first and second steam paths 222, 224 may both supply steam to the speed adjustable booster turbine 220.

As will be appreciated, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects all generally referred to herein as a "circuit", "module," or "system". Furthermore, the present invention may take the form of a computer program product on a computer-usable storage medium having computer-usable program code embodied in the medium. As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are exemplary only, and are thus not limiting as to the types of memory usable for storage of a computer program.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

The term processor, as used herein, refers to central processing units, microprocessors, microcontrollers, reduced instruction set circuits (RISC), application specific integrated circuits (ASIC), logic circuits, and any other circuit or processor capable of executing the functions described herein.

Computer program code for carrying out operations of the present invention may be written in an object oriented programming language such as Java7, Smalltalk or C++, or the like. However, the computer program code for carrying out operations of the present invention may also be written in conventional procedural programming languages, such as the "C" programming language, or a similar language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a public purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram blocks.

The present invention may include a control system, or the like, that has the technical effect of controlling the operating of an IGCC power plant 10 integrated with an embodiment of the present invention. The control system of an embodiment of the present invention may be configured to automatically and/or continuously monitor the IGCC power plant 10 to determine whether the speed adjustable booster turbine 220 should operate.

Alternatively, the control system may be configured to require a user action to the initiate operation of the speed adjustable booster turbine 220. An embodiment of the control system of the present invention may function as a stand-alone system. Alternatively, the control system may be integrated as a module, or the like, within a broader system, such as a turbine control or a plant control system.

Figure 3:
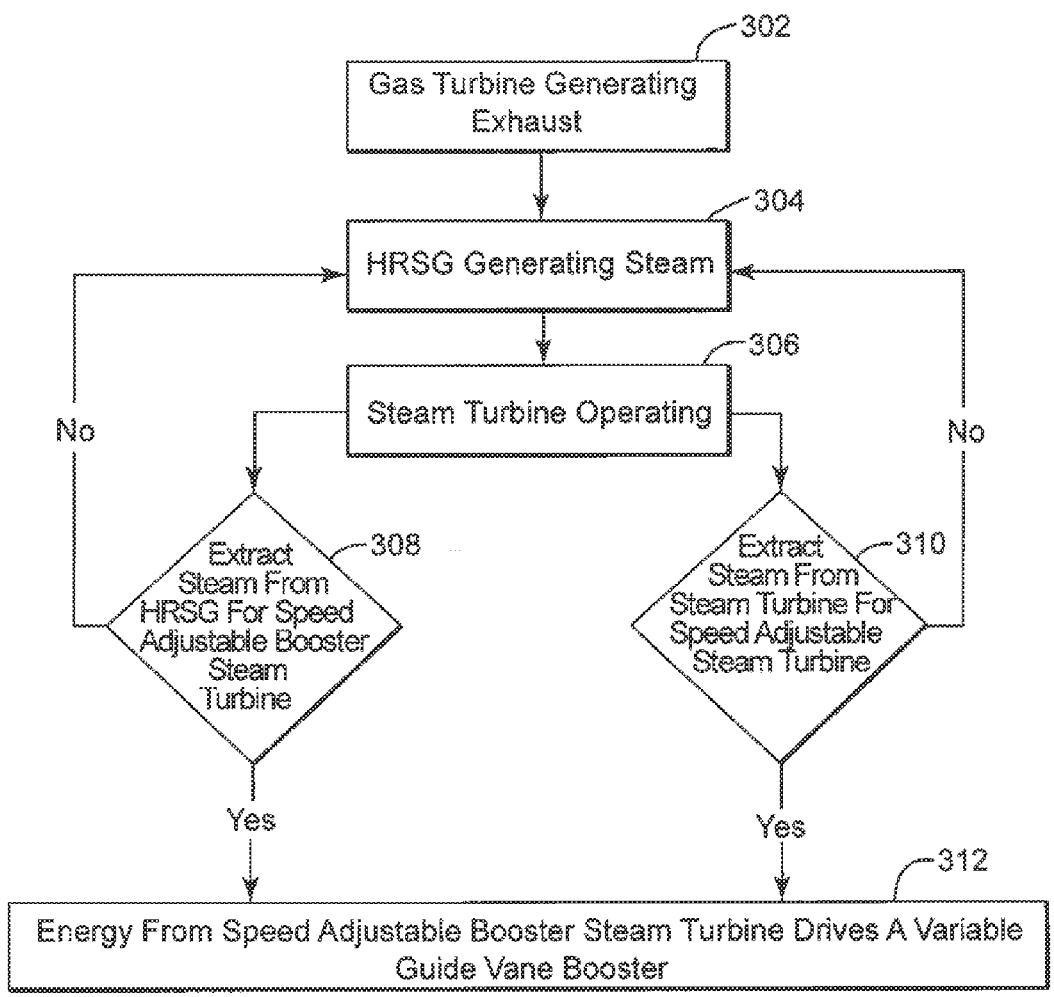
FIG. 3 is a flowchart illustrating a method of controlling a portion of the IGCC system, in accordance with an embodiment of the present invention.

FIG. 3 is a flowchart illustrating an example of a method of controlling a portion of the IGCC power plant 10, in accordance with an embodiment of the present invention.

In step 302, the method 300 may determine whether the gas turbine 20 is generating an exhaust. Here, the method 300 may include this requirement as a permissive or like, prior to initiating the operating of the variable guide vane booster 208.

In step 304, the method 300 may determine whether the HRSG 36 may be generating steam. In an embodiment of the present invention, the HRSG 36 may be required to be generating sufficient steam for operation of the speed adjustable booster turbine 220 along with the other uses of the steam on the IGCC power plant 10.

In step 306, the method 300 may determine whether the steam turbine 22 is operating. Here, an operator may determine whether sufficient energy is available for operation of the speed adjustable booster turbine 220.

In step 308, the method 300 may determine whether to extract steam from the HRSG 36 for use with the speed adjustable booster turbine 220. Here, an operator may confirm that the IGCC power plant 10 has sufficient steam, and at the required properties, available for speed adjustable booster turbine 220 operation. If sufficient steam is available then the method 300 may proceed to step 312, otherwise the method 300 may revert to step 304.

In step 310, the method 300 may determine whether to extract steam from the steam turbine 22 for use with the speed adjustable booster turbine 220. Here, an operator may confirm that the IGCC power plant 10 has sufficient steam, and at the required properties, available for speed adjustable booster turbine 220 operation. If sufficient steam is available then the method 300 may proceed to step 312, otherwise the method 300 may revert to step 304.

An embodiment of the present invention may allow the flexibility of determining how to apportion the extraction of the steam from the HRSG 36 and the steam turbine 22. This may allow an operator the ability to choose the extraction split between the HRSG 36 and the steam turbine 22 that makes the most economic and/or operation sense.

In step 312, the energy from the speed adjustable booster turbine 220 may drive the variable guide vane booster 208 as previously described. Here, the processor 232 may coordinate the operations of the speed adjustable booster turbine 220, the variable guide vane booster 208, and the ASU 14. The goal here may be to meet the operational needs of the ASU 14 and other components on the IGCC power plant 10.

Figure 4:
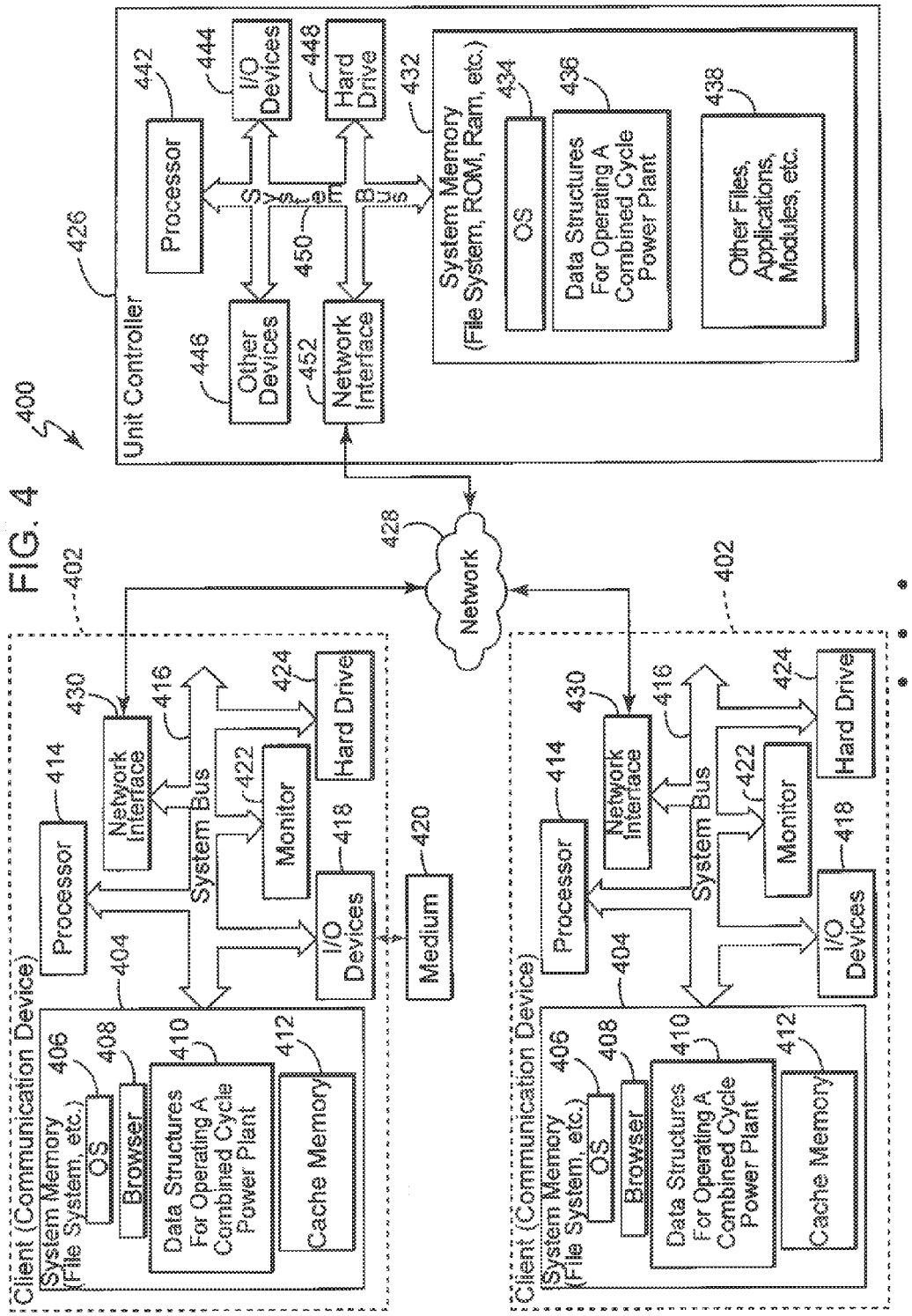
FIG. 4 is a block diagram of an exemplary system for operating a combined cycle power plant in accordance with an embodiment of the present invention.

FIG. 4 is a block diagram of an exemplary system 400 of controlling a combined cycle power plant air in accordance with an embodiment of the present invention. The elements of the method 300 may be embodied in and performed by the system 400. The system 400 may include one or more user or client communication devices 402 or similar systems or devices (two are illustrated in FIG. 4). Each communication device 402 may be for example, but not limited to, a computer system, a personal digital assistant, a cellular phone, or any device capable of sending and receiving an electronic message.

The communication device 402 may include a system memory 404 or local file system. The system memory 404 may include for example, but is not limited to, a read only memory (ROM) and a random access memory (RAM). The ROM may include a basic input/output system (BIOS). The BIOS may contain basic routines that help to transfer information between elements or components of the communication device 402. The system memory 404 may contain an operating system 406 to control overall operation of the communication device 402. The system memory 404 may also include a browser 408 or web browser. The system memory 404 may also include data structures 410 or computer-executable code for controlling a combined cycle power plant that may be similar or include elements of the method 300 in FIG. 3.

The system memory 404 may further include a template cache memory 412, which may be used in conjunction with the method 400 in FIG. 4 for controlling a combined cycle power plant.

The communication device 402 may also include a processor or processing unit 414 to control operations of the other components of the communication device 402. The operating system 406, browser 408, and data structures 410 may be operable on the processing unit 414. The processing unit 414 may be coupled to the memory system 404 and other components of the communication device 402 by a system bus 416.

The communication device 402 may also include multiple input devices (I/O), output devices or combination input/output devices 418. Each input/output device 418 may be coupled to the system bus 416 by an input/output interface (not shown in FIG. 4). The input and output devices or combination I/O devices 418 permit a user to operate and interface with the communication device 402 and to control operation of the browser 408 and data structures 410 to access, operate and control the software to utilize a combined cycle power plant. The I/O devices 418 may include a keyboard and computer pointing device or the like to perform the operations discussed herein.

The I/O devices 418 may also include for example, but are not limited to, disk drives, optical, mechanical, magnetic, or infrared input/output devices, modems or the like. The I/O devices 418 may be used to access a storage medium 420. The medium 420 may contain, store, communicate, or transport computer-readable or computer-executable instructions or other information for use by or in connection with a system, such as the communication devices 402.

The communication device 402 may also include or be connected to other devices, such as a display or monitor 422. The monitor 422 may permit the user to interface with the communication device 402.

The communication device 402 may also include a hard drive 424. The hard drive 424 may be coupled to the system bus 416 by a hard drive interface (not shown in FIG. 4). The hard drive 424 may also form part of the local file system or system memory 404. Programs, software, and data may be transferred and exchanged between the system memory 404 and the hard drive 424 for operation of the communication device 402.

The communication device 402 may communicate with at least one unit controller 426 and may access other servers or other communication devices similar to communication device 402 via a network 428. The system bus 416 may be coupled to the network 428 by a network interface 430. The network interface 430 may be a modem, Ethernet card, router, gateway, or the like for coupling to the network 428. The coupling may be a wired or wireless connection. The network 428 may be the Internet, private network, an intranet, or the like.

The at least one unit controller 426 may also include a system memory 432 that may include a file system, ROM, RAM, and the like. The system memory 432 may include an operating system 434 similar to operating system 406 in communication devices 402. The system memory 432 may also include data structures 436 for controlling a combined cycle power plant. The data structures 436 may include operations similar to those described with respect to the method 300 for controlling a combined cycle power plant. The server system memory 432 may also include other files 438, applications, modules, and the like.

The at least one unit controller 426 may also include a processor 442 or a processing unit to control operation of other devices in the at least one unit controller 426. The at least one unit controller 426 may also include I/O device 444. The I/O devices 444 may be similar to I/O devices 418 of communication devices 402. The at least one unit controller 426 may further include other devices 446, such as a monitor or the like to provide an interface along with the I/O devices 444 to the at least one unit controller 426. The at least one unit controller 426 may also include a hard disk drive 448. A system bus 450 may connect the different components of the at least one unit controller 426. A network interface 452 may couple the at least one unit controller 426 to the network 428 via the system bus 450.

The flowcharts and step diagrams in the figures illustrate the architecture, functionality, and operation of possible implementations of systems, methods, and computer program products according to various embodiments of the present invention. In this regard, each step in the flowchart or step diagrams may represent a module, segment, or portion of code, which comprises one or more executable instructions for implementing the specified logical function(s). It should also be noted that, in some alternative implementations, the functions noted in the step may occur out of the order noted in the figures. For example, two steps shown in succession may, in fact, be executed substantially concurrently, or the steps may sometimes be executed in the reverse order, depending upon the functionality involved. It will also be noted that each step of the step diagrams and/or flowchart illustration, and combinations of steps in the step diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, it should be appreciated that any arrangement, which is calculated to achieve the same purpose, may be substituted for the specific embodiments shown and that the invention has other applications in other environments. This application is intended to cover any adaptations or variations of the present invention. The following claims are in no way intended to limit the scope of the invention to the specific embodiments described herein.

What is claim is:

1. A combined cycle powerplant system comprising:
   a gas turbine comprising: a compressor, a combustion chamber, and a turbine section drivingly coupled to the compressor;
   a source of bleed air from the compressor coupled in flow communication with an inlet of a variable guide vane booster; and
   an air separation unit coupled in flow communication with an outlet of the variable guide vane booster, the variable guide vane booster integrated with a speed adjustable booster turbine, wherein the speed adjustable booster turbine powers the variable guide vane booster to extract air from the compressor and the speed adjustable booster is a single air supply source to the air separation unit.

2. The system of claim 1, wherein the speed adjustable booster turbine comprises at least one of: a steam turbine, a steam engine, or combinations thereof.

3. The system of claim 1, further comprising a heat recovery steam generator (HRSG) in flow communication with the gas turbine; wherein an inlet of the HRSG receives an exhaust from the turbine section.

4. The system of claim 3, further comprising a steam turbine in flow communication with the HRSG, wherein the steam turbine receives steam from the HRSG.

5. The system of claim 4, wherein the speed adjustable booster turbine is in flow communication with the HRSG and the speed adjustable booster turbine receives steam from the HRSG that allows for the speed adjustable booster turbine to operate.

6. The system of claim 4, wherein the speed adjustable booster turbine is in flow communication with the steam turbine and the speed adjustable booster turbine receives steam from the steam turbine that allows the speed adjustable booster turbine to operate.

7. The system of claim 4, wherein the speed adjustable booster turbine is in flow communication with the HRSG and with the steam turbine, and wherein the speed adjustable booster turbine receives steam from HRSG and from the steam turbine for operation.

8. The system of claim 4, wherein the speed adjustable booster turbine is mechanically coupled to the variable guide vane booster and the speed adjustable booster turbine determines a speed of the variable speed booster.

9. The system of claim 4, further comprising a motor coupled to the speed adjustable booster turbine wherein the speed adjustable booster turbine energizes the motor energizes the variable guide vane booster.

10. The system of claim 1, wherein the variable guide vane booster comprises at least one row of variable guide vanes and is configured to modulate a flow through the variable guide vane booster.

11. The system of claim 1, wherein the variable guide vane booster comprises at least one of: an axial booster, a centrifugal booster, and combinations thereof.

12. The system of claim 4, wherein the speed adjustable booster turbine is drivingly coupled to the variable guide vane booster, wherein the variable guide vane booster is configured to deliver a flow of compressed air at a substantially constant pressure to the air separation unit using the speed adjustable booster turbine to control a rotational speed of the variable guide vane booster.

13. The system of claim 1, wherein the speed adjustable booster turbine and the variable guide vane booster are integrated with an IGCC power plant.

14. A method of operating a combined cycle powerplant system, the method comprising:
providing a gas turbine comprising a compressor, wherein the gas turbine generates an exhaust;
coupling a source of bleed air deriving from the compressor with an inlet of a variable guide vane booster; and
coupling an outlet of the variable guide vane booster with an air separation unit, and utilizing a speed adjustable booster turbine to provide the energy required to operate the variable guide vane booster, wherein the speed adjustable booster is a single air supply source to the air separation unit.

15. The method of claim 14, further comprising configuring the compressor to supply a flow of compressed air to the air separation unit; the method further comprising utilizing the speed adjustable booster turbine to maintain a flow of compressed air that approximates the demand at a substantially constant pressure to the air separation unit coupled in flow communication with the compressor.

16. The method of claim 14, further comprising providing a heat recovery steam generator (HRSG) in flow communication with the gas turbine, and transferring an exhaust from the gas turbine to an inlet of the HRSG; and further comprising providing a steam turbine in flow communication with the HRSG, and transferring the steam from the HRSG to the steam turbine.

17. The method of claim 16, further comprising utilizing the HRSG to send steam to the speed adjustable booster turbine.

18. The method of claim 16, further comprising utilizing the steam turbine to send steam to the speed adjustable booster turbine.

19. The method of claim 16, further comprising utilizing the HRSG and the steam turbine to send steam to the speed adjustable booster turbine.

20. The method of claim 16, further comprising mechanically coupling the variable guide vane booster to the speed adjustable booster turbine.

21. The method of claim 16, further comprising coupling a motor to the speed adjustable booster turbine, utilizing the speed adjustable booster turbine to energize the motor; and utilizing the motor to energize the variable guide vane booster.

22. An integrated gasification combined cycle (IGCC) power plant comprising:
a gas turbine comprising: a compressor, a combustion chamber, and a turbine section drivingly coupled to the compressor; and
a variable guide vane booster coupled in flow communication between the compressor and an air separation unit, the variable guide vane booster configured to receive a flow of compressed air at a variable flow and pressure and to generate a flow of compressed air at a flow that matches a demand using one or more variable vanes and a substantially constant pressure to the air separation unit, the variable guide vane booster drivingly coupled to a speed adjustable booster turbine, wherein the speed adjustable booster is a single air supply source to the air separation unit.

23. The IGCC power plant of claim 22, further comprising a gasification vessel configured to receive a flow of fuel and a flow of an oxidant, the gasification vessel configured to partially oxidize the flow of fuel using the flow of oxidant to generate a synthetic gas.

24. The IGCC power plant of claim 22, wherein the speed adjustable booster turbine comprises a controller comprising a processor configured to operate the speed adjustable booster turbine and the variable guide vane booster.

25. The IGCC power plant of claim 24, wherein the controller is configured to:
receive signals relating to operating parameters of at least one of; the gas turbine and the variable guide vane booster; and
transmit command signals to the speed adjustable booster turbine such that the speed adjustable booster turbine is controlled to provide a flow that matches a demand of the air separation unit and a substantially constant pressure to the air separation unit.

26. The IGCC power plant of claim 22, further comprising an intercooler coupled in flow communication between the compressor and the variable guide vane booster, wherein the intercooler is configured to reduce a temperature of the flow of compressed air deriving the compressor.

* * * * *